(12) United States Patent
Menosky et al.

(10) Patent No.: US 7,025,679 B2
(45) Date of Patent: Apr. 11, 2006

(54) UNIVERSAL JOINT WITH BEARING CUP RETENTION THRUST WASHER

(75) Inventors: Marc M. Menosky, Burt, MI (US); Salvatore N. Grupido, Rochester, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 11/051,805

(22) Filed: Feb. 4, 2005

(65) Prior Publication Data

US 2005/0130748 A1 Jun. 16, 2005

Related U.S. Application Data

(63) Continuation of application No. 10/412,925, filed on Apr. 14, 2003, now Pat. No. 6,855,059.

(51) Int. Cl.
*F16D 3/41* (2006.01)
(52) U.S. Cl. ........................... 464/14; 464/132
(58) Field of Classification Search ........... 464/11–14, 464/136, 128–132, 133; 384/126, 127, 452
See application file for complete search history.

(56) References Cited

U.S. PATENT DOCUMENTS

| 1,993,192 | A | * | 3/1935 | Swenson ................. 464/131 X |
| 2,051,248 | A | * | 8/1936 | Dunn |
| 2,067,286 | A | * | 1/1937 | Pearce ....................... 464/11 X |
| 3,658,395 | A | | 4/1972 | Hallerback |
| 3,846,995 | A | | 11/1974 | Mangiavacchi |
| 4,366,966 | A | | 1/1983 | Ratsko et al. |
| 4,886,479 | A | * | 12/1989 | Richtmeyer et al. ..... 464/132 X |
| 4,936,133 | A | | 6/1990 | Orain |
| 4,943,262 | A | | 7/1990 | Schultze |
| 5,725,431 | A | | 3/1998 | Myers et al. |
| 5,813,916 | A | | 9/1998 | Lentini et al. |
| 5,865,678 | A | | 2/1999 | Koedam et al. |
| 6,129,634 | A | | 10/2000 | Nieman |
| 6,162,126 | A | | 12/2000 | Barrett et al. |
| 6,264,566 | B1 | | 7/2001 | Nieman et al. |
| 6,280,335 | B1 | | 8/2001 | Wehner et al. |
| 6,336,868 | B1 | | 1/2002 | Kurecka et al. |
| 6,357,757 | B1 | | 3/2002 | Hibbler et al. |

FOREIGN PATENT DOCUMENTS

DE  242 457 A1 * 1/1987 ................. 464/128

* cited by examiner

*Primary Examiner*—Greg Binda
(74) *Attorney, Agent, or Firm*—Harness, Dickey & Pierce P.L.C.

(57) ABSTRACT

A universal joint includes a pair of bifurcated yokes interconnected by a cruciform. The cruciform includes four orthogonal trunnions each including a lubricant passage. A thrust washer engages a portion of the trunnion to retain a bearing assembly on each trunnion.

19 Claims, 6 Drawing Sheets

UNIVERSAL JOINT WITH BEARING CUP RETENTION THRUST WASHER

CROSS-REFERENCE TO RELATED APPLICATIONS

This application is a continuation of U.S. patent application Ser. No. 10/412,925 filed on Apr. 14, 2003, now U.S. Pat. No. 6,855,059. The disclosure of the above application is incorporated herein by reference.

BACKGROUND OF THE INVENTION

The present invention generally relates to a universal joint for use in a driveline of a motor vehicle. More specifically, the present invention pertains to a universal joint equipped with a mechanism for securing a bearing cup assembly to a cruciform trunnion.

As is commonly known, universal joints are used in motor vehicle driveline applications for interconnecting a pair of rotary shafts and permitting changes in angularity therebetween. Many conventional universal joints include a pair of bifurcated yokes which are secured to the rotary shafts. The bifurcated yokes are interconnected by a spider or a cruciform for rotation about independent axes. The cruciform includes four orthogonal trunnions with each opposing pair of axially aligned trunnions mounted in a pair of aligned bores formed in the bifurcated yokes. Typically, a bearing cup is secured in each bore and a bearing assembly is retained in the bearing cup such that each yoke is supported for pivotal movement relative to one of the pairs of trunnions. In addition, it is known to use a thrust washer between the trunnion and the bearing cup to absorb the radially-directed thrust forces which may occur therebetween.

During assembly of the universal joint, difficulties may arise when attempting to couple the bearing assemblies to the bifurcated yokes. Typically, each bearing assembly, thrust washer and bearing cup are positioned on a trunnion but not positively retained thereto. During the assembly process, the bearing cup and bearing assembly may be accidentally disrupted and separated from the trunnion. Gravitational forces may also cause separation of the components during the assembly process. Possible bearing contamination and loss of productivity may result. In some instances, extraneous straps, nets or other packaging are used to retain the bearing cup assemblies in place during shipping and handling. These straps must be removed and discarded by the end user requiring expense of time and cost. Accordingly, it would be advantageous to provide a universal joint having bearing cup assemblies which are retained on the trunnions without the use of external discardable devices.

SUMMARY OF THE INVENTION

The present invention is directed to a universal joint for interconnecting a pair of rotating shafts. The universal joint includes a pair of bifurcated yokes interconnected by a cruciform. The cruciform includes four orthogonal trunnions each including a lubricant passage. A thrust washer engages a portion of the trunnion to retain a bearing assembly on each trunnion.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

In general, the present invention is directed to a universal joint of the type used in motor vehicle driveline applications for interconnecting rotating shafts in a manner permitting changes in angularity therebetween.

Figure 1:
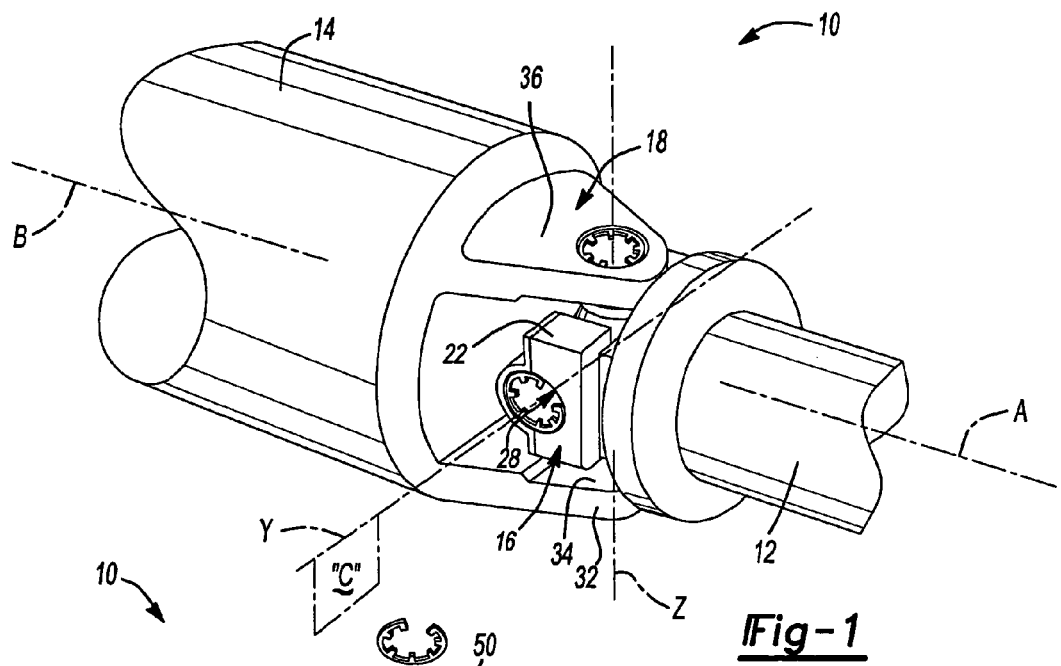
FIG. 1 is a perspective view of a universal joint according to the principals of the present invention.
Figure 2:
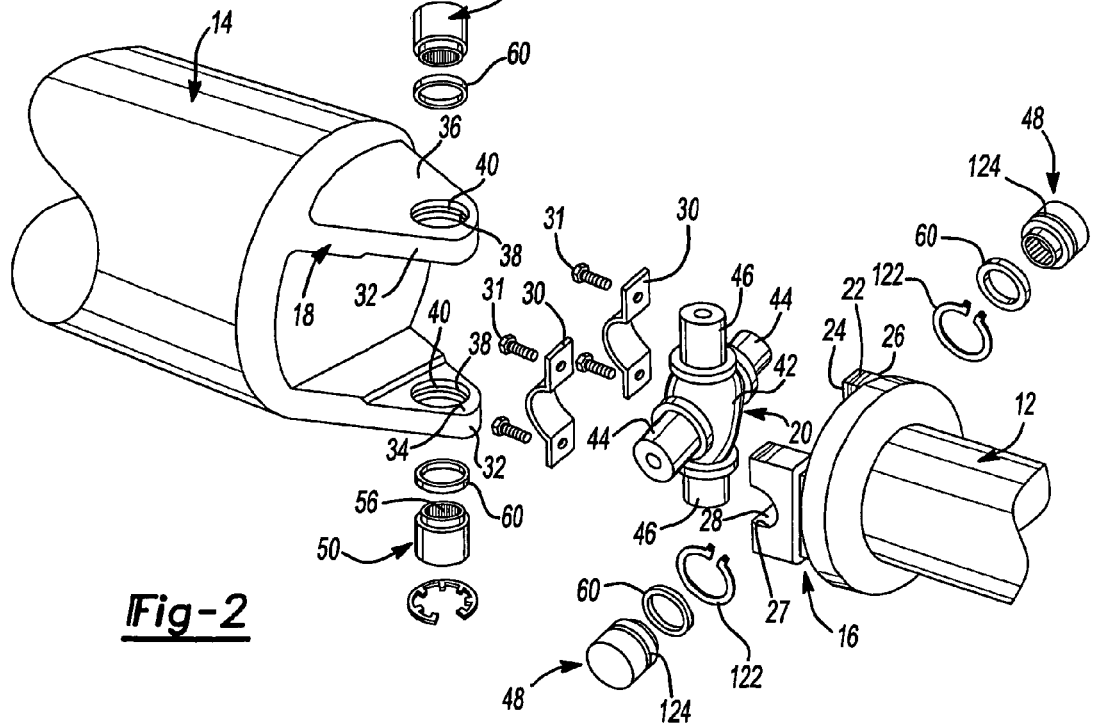
FIG. 2 is an exploded perspective view of the universal joint shown in FIG. 1.

Referring to FIGS. 1 and 2, a universal joint 10 is shown connecting a first shaft 12 to a second shaft 14. In general, universal joint 10 includes a first yoke 16 attached to an end of first shaft 12, a second yoke 18 attached to an end of second shaft 14 and a cruciform 20 interconnecting first yoke 16 to second yoke 18. The first yoke 16 is bifurcated and includes a pair of laterally-spaced legs 22 which are preferably symmetrical with respect to the rotary axis of first shaft 12, as denoted by construction line "A". Legs 22 include an inboard surface 24 and an outboard surface 26 with a journal 27 extending therebetween. Apertures 28 are formed by coupling a pair of end caps 30 to legs 22 via fasteners 31. End caps 30 cooperate with journals 27 to complete apertures 28. Apertures 28 are aligned on a first trunnion axis, as denoted by construction line "Y", which passes through and is orthogonal with respect to rotary axis "A" of first shaft 12.

Second yoke 18 is bifurcated and includes a pair of laterally-spaced legs 32 which are preferably symmetrical with respect to the rotary axis of second shaft 14, as denoted by construction line "B". Legs 32 include an inboard surface 34 and an outboard surface 36 with an aperture 38 extending therebetween. Apertures 38 are aligned on a second trunnion axis, as denoted by construction line "Z", which passes through and is orthogonal with respect to rotary axis "B" of second shaft 14. Apertures 38 are throughbores which include an annular groove 40 formed between the inboard surface 34 and the outboard surface 36. It should be noted that the shape and dimensions of apertures 28 and 38 may either be identical or different depending on the particular dimensions of cruciform 20 used therewith. It should also be noted that the annular ring grooves 40 may be formed by machining, casting or by similar technique.

As best seen in FIG. 2, cruciform 20 includes a central hub 42 from which a pair of first trunnions 44 and a pair of second trunnions 46 extend. First trunnions 44 are orthogonal with respect to second trunnions 46. First trunnions 44 are adapted for insertion into apertures 28 in legs 22 of first yoke 16 so as to be axially aligned on first trunnion axis "Y". Similarly, second trunnions 46 are adapted to be inserted into apertures 38 in legs 32 of second yoke 18 so as to be axially aligned on second trunnion axis "Z". With first trunnions 44 and second trunnions 46 installed in first and second yokes 16 and 18, respectfully, trunnion axes "Y" and "Z" pass through a common plane "C" which orthogonally intersects the rotary axis of cruciform 20, as shown in FIG. 1.

Universal joint 10 also includes a first pair of bearing cup assemblies 48 adapted to be mounted in apertures 28 and a second pair of bearing cup assemblies 50 adapted to be mounted in apertures 38. First bearing cup assemblies 48 are provided for receiving and rotatably supporting first trunnions 44 in apertures 28. Similarly, second bearing cup assemblies 50 are provided for receiving and rotatably supporting second trunnions 46 in apertures 38. For purposes of brevity, the following description will be limited to the components of first bearing cup assemblies 48 with the understanding that the corresponding components of second bearing cup assemblies 50 are substantially identical.

Figure 3:
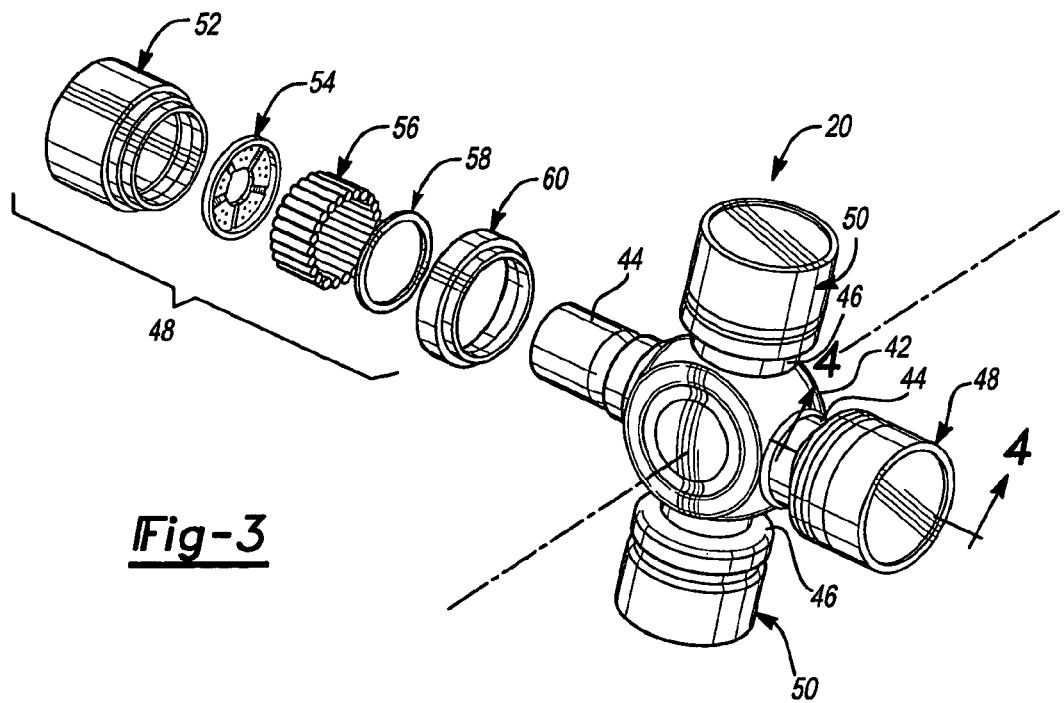
FIG. 3 is a partial exploded perspective view of a trunnion and bearing cup assembly of the present invention.
Figure 4:
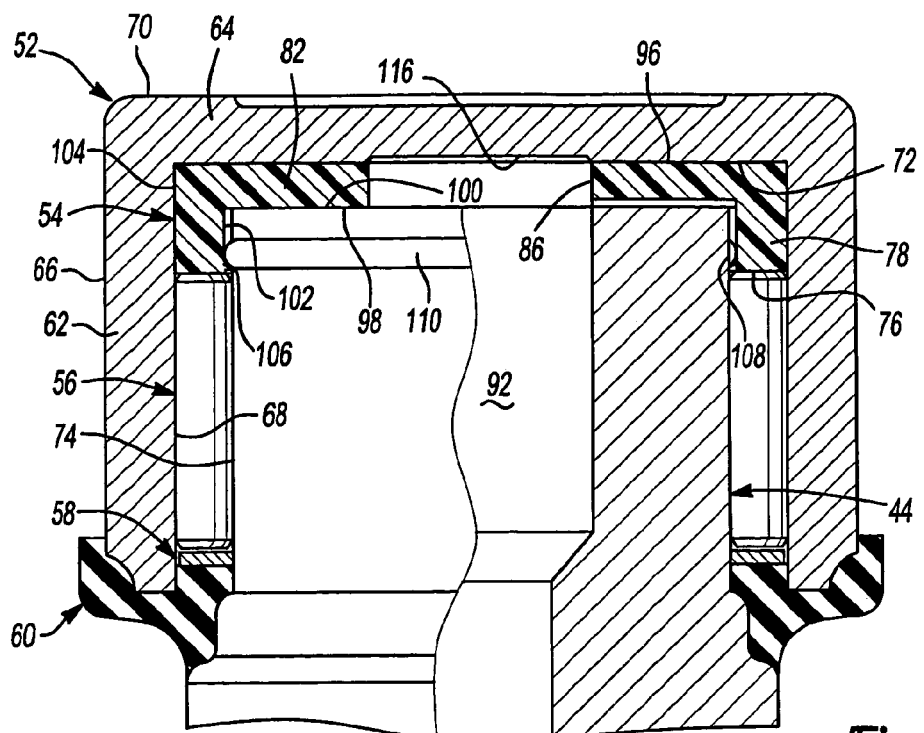
FIG. 4 is a partial cross-sectional side view of a universal joint including a thrust washer constructed in accordance with the teachings of the present invention.
Figure 5:
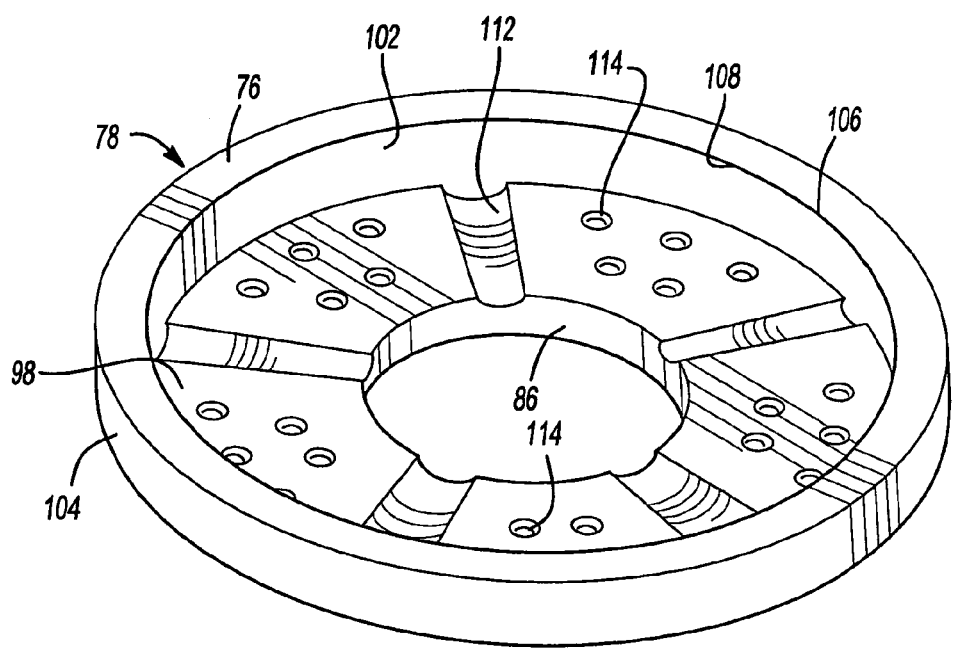
FIG. 5 is a perspective view of the thrust washer shown in FIG. 4; in accordance with the teachings of the present invention.

FIGS. 3–5 depict each bearing cup assembly 48 as including a bearing cup 52, a thrust washer 54, roller bearings 56, a seal washer 58 and an elastomeric seal 60. Bearing cup 52 is substantially hollow and cylindrical in shape. Bearing cup 52 includes a substantially cylindrical tubular segment 62 closed at one end by an end segment 64. Tubular segment 62 includes an outer wall surface 66 and an inner wall surface 68. End segment 64 includes an outer surface 70 and an inner surface 72. Roller bearings 56 are positioned between inner wall surface 68 and an outer wall surface 74 of trunnion 44 to allow relative rotary movement between bearing cup 52 and trunnion 44. Roller bearings 56 are oriented to rotate on an axis parallel to axis "Y" of trunnions 44 and are arranged in a circumferential array about this axis. One end of each roller bearing 56 is supported to roll against the bearing surface 76 formed on a circumferential flange segment 78 of thrust washer 54. The opposite ends of roller bearings 56 are captured by seal washer 58 which, in turn, is retained by seal 60. Seal 60 extends between outer wall surface 66 of bearing cup 52 and outer wall surface 74 of trunnion 44 to protect roller bearings 56 from contamination and to retain lubricant within bearing cup assembly 48.

As best shown in FIGS. 4 and 5, thrust washer 54 includes a disk segment 82 from which circumferential flange 78 extends. A central aperture 86 extends through disk segment 82 and is in communication with a lubricant passage 92 found in each trunnion. A fitting (not shown) mounted on central hub 42 of cruciform 20 communicates with lubricant passage 92. The fitting is used to supply lubricant to passage 92 for lubricating roller bearings 56 as well as for providing a lubricant film between relatively moveable surfaces.

Disk segment 82 has an outer face surface 96 which faces and contacts inner surface 72 of bearing cup 52. Disk segment 82 also includes an inner face surface 98 which faces and contacts an end surface 100 of trunnion 44. Inner face surface 98 and outer face surface 96 are substantially parallel such that disk segment 82 has a constant thickness. In addition, thrust washer 54 includes a circumferential inner wall surface 102 and a circumferential outer wall surface 104, as defined by flange segment 78. Circumferential inner wall surface 102 is adapted to face outer wall surface 74 of trunnion 44. Circumferential outer wall surface 104 contacts inner wall surface 68 of bearing cup 52. As such, thrust washer 54 functions to align bearing cup 52 and trunnion 44.

Circumferential inner wall surface 102 includes a lip 106 extending radially inwardly therefrom. Lip 106 is an annular structure defining a localized aperture 108 having a reduced effective inner diameter at the location of the lip when compared to the remainder of circumferential inner wall surface 102. Lip 106 may be defined as an uninterrupted structure as shown in FIG. 5 or may include spaces between a plurality of lip portions. Each lip portion includes the cross-sectional features shown in FIG. 4. Trunnion 44 includes a radially outwardly extending annular ring 110 positioned near its distal end. Lip 106 is positioned along flange segment 78 to engage a portion of annular ring 110 once thrust washer 54 and bearing cup 52 are in the installed position depicted in FIG. 4.

Thrust washer 54 includes a series of lubrication grooves 112 which extend radially from central aperture 86 to circumferential inner wall surface 102 of flange segment 78. Grooves 112 are arcuate in profile to define a cylindrical wall surface. It is preferable that an odd number of grooves 112 are provided and which are equally spaced to define a like number of pie-shaped portions of disk segment 82. In addition, a plurality of indentations or dimples 114 are formed on the pie-shaped portions of disk segment 82. Dimples 114 can be randomly oriented or, more preferably, be aligned to define two circumferential rows. Dimples 114 are adapted to retain lubricant therein to provide continuous lubrication over a large area of trunnion end surface 100. In addition, dimples 114 allow contaminants to be removed from the operating surfaces and be collected therein. A pocket 116 is formed in cup 52 for retaining lubricant in a reservoir for use during operation of the universal joint. Thrust washer 54 is constructed from a resilient material such as injection molded plastic.

To assemble universal joint 10, first bearing cup assemblies 48 and second bearing cup assemblies 50 are installed on a respective trunnion. During the installation process, thrust washer 54 is axially disposed over trunnion 44. Lip 106 engages annular ring 110 in a snap-fit arrangement. Because lip 106 of thrust washer 54 is sized to nominally interfere with annular ring 110, at least a portion of flange segment 78 is deformed during installation. Flange segment 78 springs back once lip 106 passes annular ring 110. In this manner, thrust washer 54 and roller bearings 56 are retained on trunnion 44. Specifically, a dislodging or removal force supplied to bearing cup 52 will be resisted by seal 60 transferring the axial load through seal washer 58, roller bearings 56 and thrust washer 54.

Figure 6:
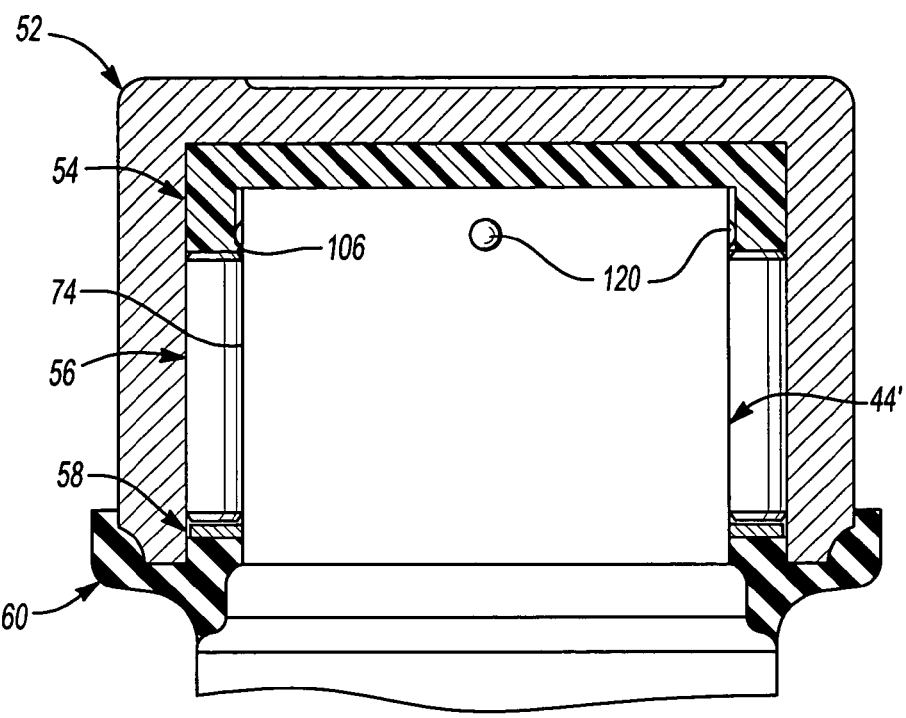
FIG. 6 is a partial cross-sectional side view of a universal joint including alternate trunnion and the thrust washer of FIG. 4.

FIG. 6 depicts an alternate embodiment trunnion identified at reference numeral 44'. Trunnion 44' is substantially similar to trunnion 44 previously described. However, trunnion 44' includes a plurality of protrusions 120 radially extending from outer wall surface 74 in lieu of annular ring 110. Protrusions 120 are generally hemispherically shaped. Protrusions 120 assure that at least a portion of lip 106 of thrust washer 54 engages trunnion 44'. Accordingly, first bearing cup assembly 48 is axially retained on trunnion 44'.

Figure 7:
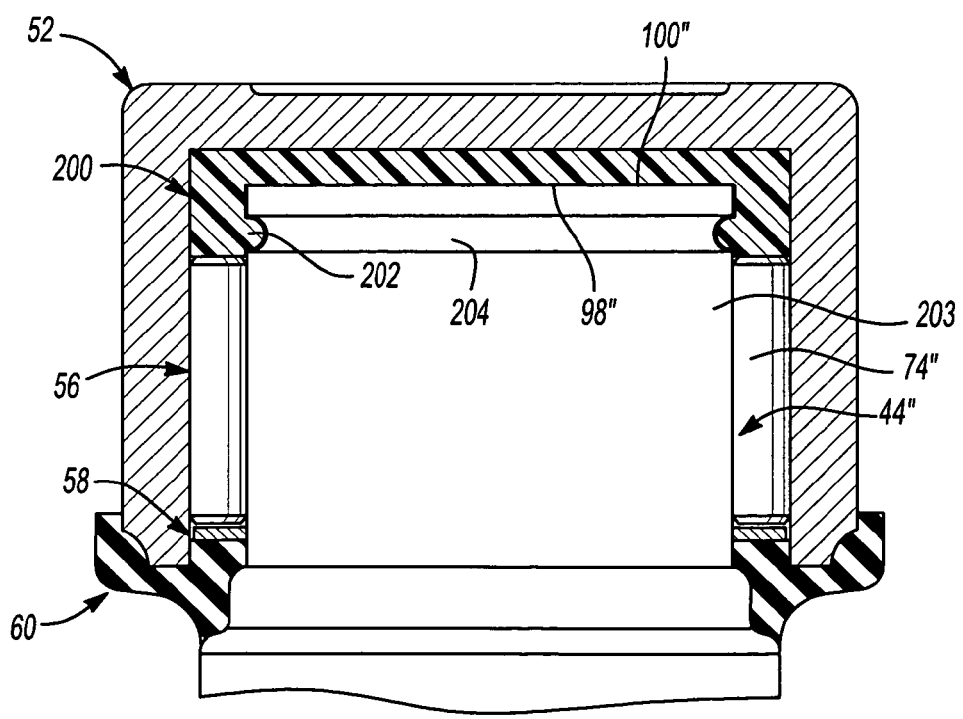
FIG. 7 is a partial cross-section side view of a universal joint including an alternate embodiment thrust washer and an alternate embodiment trunnion.
Figure 8:
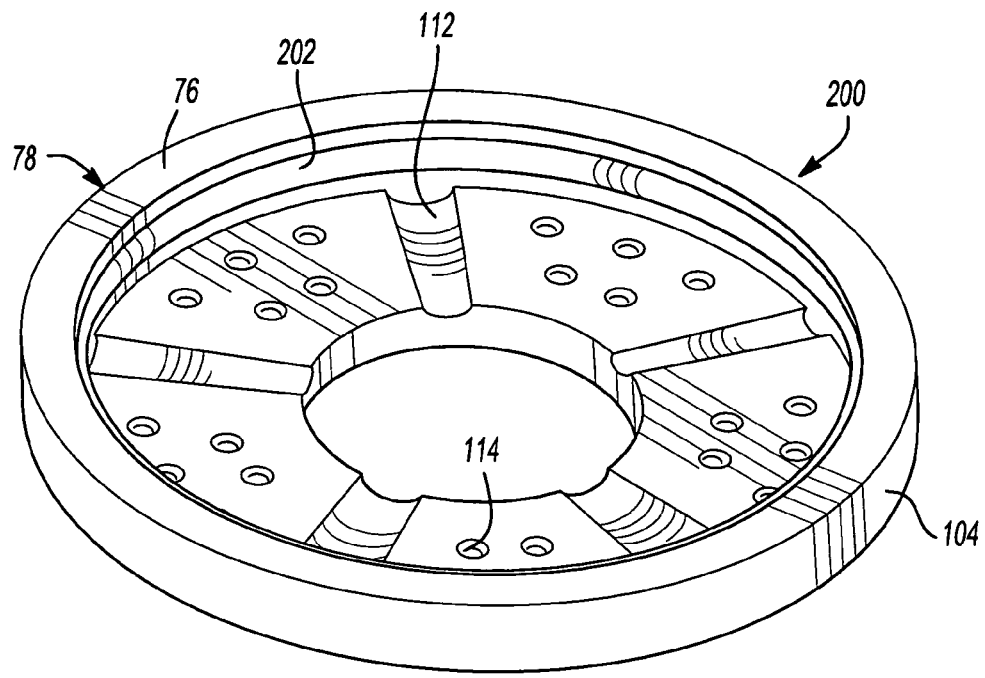
FIG. 8 is a perspective view of the thrust washer shown in FIG. 7.

FIGS. 7 and 8 depict an alternate embodiment thrust washer 200. Thrust washer 200 is substantially similar to thrust washer 54. Accordingly, only the substantial differences will be described hereinafter. Thrust washer 200 includes a radially inwardly extending annular ring 202 extending from flange segment 78. Flange segment 78 includes circumferential outer wall surface 104 that defines an outer diameter of thrust washer 200. An alternate trunnion 44" includes a substantially right-cylindrically-shaped portion 203 having a distal end including an annular groove 204. Groove 204 is formed on a substantially cylindrical outer wall surface 74" having a constant diameter on either side of groove 204. Trunnion 44" also includes an end face 100" in contact with a substantially planar inner face surface 98" of thrust washer 200. A majority of end face 100" is engaged with inner face surface 98". Groove 204 is positioned and sized to receive annular ring 202 of thrust washer 200. Annular ring 202 is installed within groove 204 as a snap-fit connection where thrust washer 200 is deformed during initial positioning over trunnion 44". Flange segment 78 springs back to an undeformed condition once annular ring 202 enters groove 204.

Figure 9:
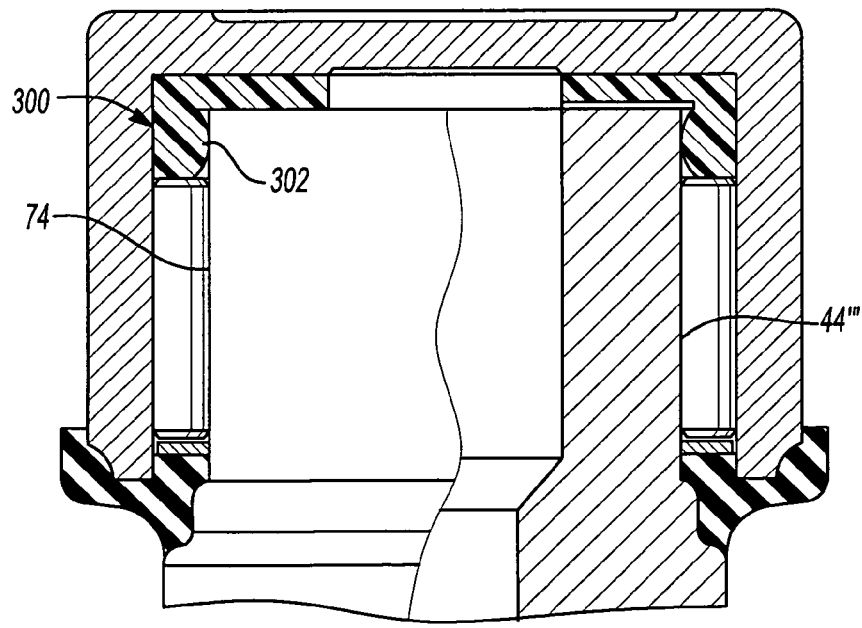
FIG. 9 is a partial cross-sectional side view of the universal joint including another alternate embodiment thrust washer constructed in accordance with the teachings of the present invention.
Figure 10:
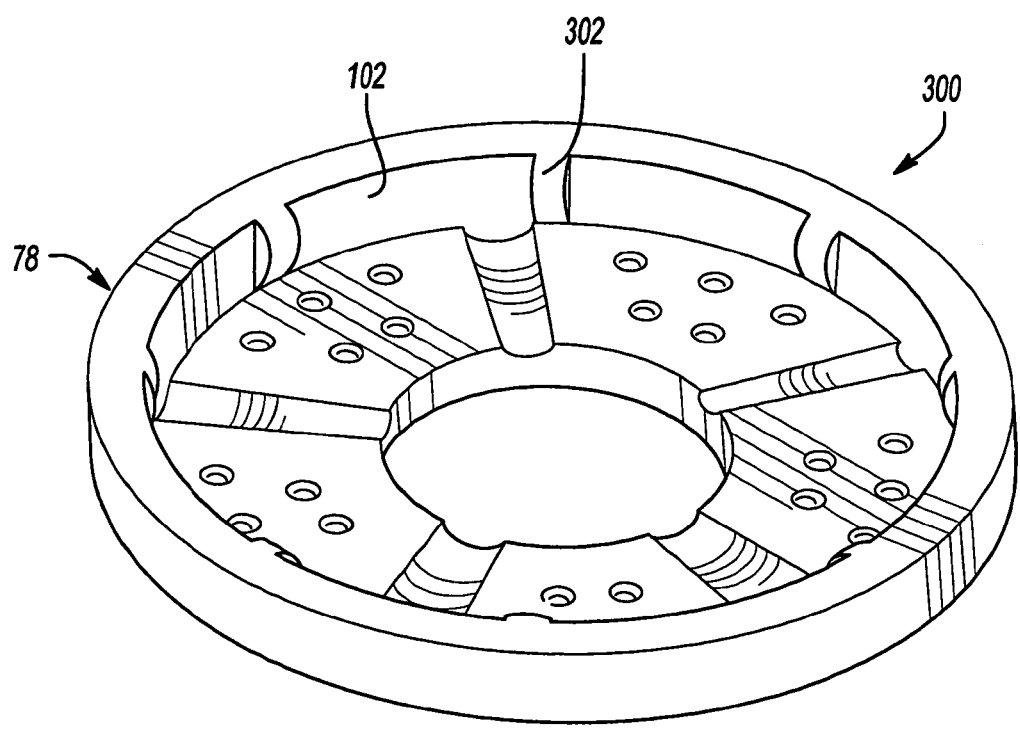
FIG. 10 is a perspective view of the thrust washer of FIG. 9.

FIGS. 9 and 10 show another alternate embodiment thrust washer depicted at reference numeral 300. Thrust washer 300 includes a plurality of radially inwardly extending ribs 302. Ribs 302 are circumferentially spaced apart from one another and positioned on circumferential wall surface 102.

Thrust washer 300 is operable with another alternate trunnion 44''' which includes a standard uninterrupted cylindrical shape having the outer wall surface 74 and end surface 100. During the installation of thrust washer 300 onto trunnion 44''', ribs 302 engage outer wall surface 74 of trunnion 44''' to cause flange 78 to open or yawn. Because thrust washer 300 is constructed from a resilient material such as injection molded plastic, flange 78 biasedly engages outer wall 74 of trunnion 44''' to retain bearing cup assembly 48 on trunnion 44'''.

Once bearing cup assemblies 48 and 50 are installed on trunnions 44 and 46, the bearing cup assemblies are inserted into leg apertures 28 and 38. Thereafter, cruciform 20 is centered, dynamically balanced and coupled to legs 22 and 32. A variety of methods for securing yokes 16 and 18 to cruciform 20 are available. One method includes mounting a snap ring 122 within a circumferential groove 124 formed above outer wall surface 66 of bearing cup 52. Snap ring 122 engages inboard surface 24 to retain the bearing assembly. Alternatively, portions of outboard surface 26 surrounding apertures 28 may be deformed using processes such as staking or peening to create local areas which engage outer end surface 70 of bearing cup 52. Another method involves injecting molten resin within a passageway extending between the leg and the bearing cup. The molten resin solidifies to retain the bearing cup within the aperture of the leg. Yet another retention method incorporates the use of projections (not shown) extending from legs 22 which may be deformed to engage a snap ring against outer end surface 70 of bearing cup 52. One or more of these methods is disclosed in commonly-owned U.S. Pat. Nos. 6,280,335, 6,162,126 and 6,336,868, the entire disclosure of each being hereby incorporated by reference.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A universal joint comprising:
a yoke including a leg having an aperture extending therethrough;
a cruciform having a trunnion, said trunnion including a substantially cylindrical portion having an outer substantially cylindrical surface and an end face;
a bearing rotatably positioned on said substantially cylindrical portion; and
a thrust washer having a substantially planar disk segment, a flange circumscribing said disk segment and an annular ring extending radially inwardly from an inner surface of said flange, said inner surface of said flange partially enveloping said substantially cylindrical portion and said annular ring being positioned within an annular groove formed on said outer substantially cylindrical surface of said trunnion to retain said bearing on said trunnion.

2. The universal joint of claim 1 wherein said trunnion includes a lubricant passage extending at least partially through said trunnion in communication with said end face.

3. The universal joint of claim 2 wherein said thrust washer includes an aperture extending through said disk segment, said aperture being in communication with said lubricant passage.

4. The universal joint of claim 3 wherein said disk segment includes a plurality of circumferentially spaced apart grooves extending from said thrust washer aperture.

5. The universal joint of claim 4 wherein said disk segment includes a plurality of dimples positioned in said disk segment between said grooves, said dimples being operable to retain lubricant between said thrust washer and said trunnion.

6. The universal joint of claim 1 wherein said flange of said thrust washer includes an annular end face engaging an end of said bearing.

7. The universal joint of claim 1 wherein said flange is resilient and said annular ring is biasedly engaged with said outer substantially cylindrical surface during installation of said thrust washer.

8. The universal joint of claim 1 further including a bearing cup encompassing said thrust washer and said bearing, said bearing cup being positioned within said yoke aperture.

9. A universal joint comprising:
a cruciform having a trunnion with a groove;
a bearing cup encompassing a portion of said trunnion including said groove;
a bearing positioned within said bearing cup and rotatably positioned on said trunnion; and
a thrust washer positioned within said bearing cup, said thrust washer including a disk segment surrounded by a cylindrical wall segment, said thrust washer also including a protrusion radially inwardly extending from said cylindrical wall segment, said protrusion being positioned within said groove to retain said bearing on said trunnion.

10. The universal joint of claim 9 wherein said groove is formed on a substantially cylindrically shaped portion of said trunnion spaced apart from an end face of said trunnion.

11. The universal joint of claim 10 wherein said protrusion engages said groove in a snap-fit arrangement.

12. The universal joint of claim 11 wherein said protrusion of said thrust washer is shaped as an annular ring.

13. The universal joint of claim 12 wherein said annular ring substantially fills said groove.

14. A universal joint comprising:
a first shaft rotatable about a first axis;
a second shaft being rotatable about a second axis not coaxially aligned with said first axis, said second shaft including a yoke with two spaced apart legs, each leg having an aperture extending therethrough;
a cruciform having trunnions, each trunnion including an end portion having an end face;

a bearing rotatably positioned on one of said trunnions; and a thrust washer having a substantially planar disk segment and a circumferential flange, said disk segment engaging a majority of said end face of said one trunnion, said circumferential flange including an inner surface having an annular ring protruding inwardly therefrom, said annular ring being positioned within an annular groove formed on said end portion of said one trunnion.

15. The universal joint of claim 14 wherein said end portion of said one trunnion has an outer diameter equal to an outer diameter of the trunnion where said bearing is positioned.

16. The universal joint of claim 14 wherein said end portion is substantially shaped as a right circular cylinder.

17. The universal joint of claim 14 wherein said circumferential flange terminates at a surface adjacent an end face of said bearing.

18. A universal joint comprising:
a first shaft rotatable about a first axis;
a second shaft being rotatable about a second axis not coaxially aligned with said first axis, said second shaft including a yoke with two spaced apart legs, each leg having an aperture extending therethrough;

a cruciform having trunnions, one of said trunnions having an end face and a groove offset from said end face;

a bearing cup having a hollow circular cylindrical side wall enclosed by an end wall, said bearing cup encompassing said end face and said groove;

a bearing positioned within said bearing cup and rotatably positioned on said one trunnion; and a thrust washer positioned within said bearing cup in engagement with said end wall, said thrust washer including a cylindrical wall segment capped by a disk segment, said cylindrical wall segment defining an outer diameter of said thrust washer, said thrust washer also including a protrusion radially inwardly extending from said cylindrical wall segment, said protrusion being positioned within said groove to retain said bearing on said one trunnion.

19. The universal joint of claim 18 wherein said groove is axially positioned between two substantially cylindrically shaped portions of said one trunnion having the same outer diameter.

* * * * *